(12) United States Patent
Taketsuna

(10) Patent No.: US 12,489,349 B2
(45) Date of Patent: Dec. 2, 2025

(54) ELECTRIC POWER GENERATOR

(71) Applicant: Hidenobu Taketsuna, Osaka (JP)

(72) Inventor: Hidenobu Taketsuna, Osaka (JP)

(*) Notice: Subject to any disclaimer, the term of this patent is extended or adjusted under 35 U.S.C. 154(b) by 194 days.

(21) Appl. No.: 18/566,658

(22) PCT Filed: Mar. 28, 2022

(86) PCT No.: PCT/JP2022/017761
§ 371 (c)(1),
(2) Date: Dec. 3, 2023

(87) PCT Pub. No.: WO2022/254976
PCT Pub. Date: Dec. 8, 2022

(65) Prior Publication Data
US 2024/0266932 A1    Aug. 8, 2024

(30) Foreign Application Priority Data
Jun. 5, 2021 (JP) .................................. 2021-115997

(51) Int. Cl.
*H02K 16/02* (2006.01)
(52) U.S. Cl.
CPC .................................. *H02K 16/02* (2013.01)
(58) Field of Classification Search
CPC .............................. H02K 16/02; H02K 21/24
See application file for complete search history.

(56) References Cited

U.S. PATENT DOCUMENTS

| | | |
|---|---|---|
| 7,294,948 B2 | 11/2007 | Wasson et al. |
| 7,595,575 B2 | 9/2009 | Kaneko et al. |
| 9,318,938 B2 | 4/2016 | Carpenter et al. |
| 9,584,056 B2 | 2/2017 | Ritchey |
| 11,387,692 B2 | 7/2022 | Hunstable |

(Continued)

FOREIGN PATENT DOCUMENTS

| | | | |
|---|---|---|---|
| AU | 2022220340 A1 | 8/2023 | |
| CA | 2654462 A1 * | 12/2007 | ............. H02K 21/12 |

(Continued)

OTHER PUBLICATIONS

CA-2654462-A1, all pages (Year: 2007).*

(Continued)

*Primary Examiner* — Naishadh N Desai
(74) *Attorney, Agent, or Firm* — Maschoff Brennan

(57) ABSTRACT

In order to create an efficient electric power generator that suppresses cogging, reduces leakage of magnetic flux density, and regulates magnetic flux density orientation, an electricity generating coil with a ferromagnetic body core is used. A magnetic body core is sandwiched between the first magnetic bodies. First magnets are fixed to both sides of the electricity-generating coil by second magnetic bodies and first non-magnetic body spacers. This ensures a fixed space between the first magnets and the first magnetic bodies. On one side of the second magnetic body, a pair of first magnets is fixed to both ends. When a rotating portion is rotated, the opposing first magnets and the electricity generating coil are aligned on a straight line, and the magnetic flux density orientation lies in one direction through the second magnetic body, including the opposing first magnets.

8 Claims, 14 Drawing Sheets

(56) References Cited

U.S. PATENT DOCUMENTS

| | | | |
|---|---|---|---|
| 11,811,274 B1* | 11/2023 | Illanes | .................. H02K 53/00 |
| 2003/0127919 A1 | 7/2003 | Matsuzawa | |
| 2004/0108789 A1 | 6/2004 | Marshall | |
| 2005/0067913 A1 | 3/2005 | Kolomeitsev et al. | |
| 2008/0088200 A1* | 4/2008 | Ritchey | .................. H02K 21/12 |
| | | | 310/112 |
| 2011/0309726 A1 | 12/2011 | Carpenter et al. | |
| 2013/0154397 A1 | 6/2013 | Sullivan | |
| 2016/0329796 A1 | 11/2016 | Hano et al. | |

FOREIGN PATENT DOCUMENTS

| | | |
|---|---|---|
| CN | 101803161 B | 11/2012 |
| CN | 103493337 B | 12/2016 |
| CN | 109075680 B | 8/2020 |
| DE | 10 2007 041 128 B4 | 12/2011 |
| JP | 2002-10573 A | 1/2002 |
| JP | 2006-219981 A | 8/2006 |
| JP | 3804343 B2 | 8/2006 |
| JP | 2008-148393 A | 6/2008 |
| JP | 2009-540776 A | 11/2009 |
| JP | 2012-518377 A | 8/2012 |
| JP | 5176225 B2 | 4/2013 |
| JP | 2019-216530 A | 12/2019 |

OTHER PUBLICATIONS

Islam, R. et al., "Permanent Magnet Synchronous Motor Magnet Designs with Skewing for Torque Ripple and Cogging Torque Reduction," IEEE Industry Applications Annual Meeting, pp. 1552-1559 (2007).

Krøvel, Ø., "Design of Large Permanent Magnetized Synchronous Electric Machines: Low Speed, High Torque Machines—Gererator for Direct Driven Wind Turbine—Motor for Rim Driven Thruster," Norwegian University of Science and Technology, (Feb. 2011).

Haider, A.K.M. Sifat, et al., "Dynamic Modeling and Control of Permanent Magnet Synchronous Generator (PMSG) in Wind Energy Conversion System," Library IUT Institutional Repository, (2015).

Geng, W. et al., "Analysis and Implementation of New Ironless Stator Axial-Flux Permanent Magnet Machine With Concentrated Non-overlapping Windings," IEEE Transactions on Energy Conversion, vol. 33, Issue 3, pp. 1274-1284 (Sep. 2018).

Nur, T. et al., "Novel of Cogging Torque Reduction Technique for Permanent Magnet Generator by Compounding of Magnet Edge Shaping and Dummy Slotting in Stator Core," International Journal on Advanced Science Engineering and Information Technology, vol. 10, Issue 3, pp. 1191-1199 (Jun. 2020).

Rahman, A. et al., "Recent Progress in Electrical Generators for Oceanic Wave Energy Conversion," IEEE Access, vol. 8, pp. 138595-138615 (Jul. 29, 2020).

* cited by examiner

ELECTRIC POWER GENERATOR

TECHNICAL FIELD

The present invention relates to a generator using a power generation coil having a magnetic core, and relates particularly to a magnet generator that suppresses cogging, reduces leakage of magnetic flux density, and regulates a direction of the magnetic flux density.

BACKGROUND ART

Many generators have been put into practical use in which a coreless coil is sandwiched between magnets and magnetic bodies for suppressing cogging each of which maintains a constant distance (for example, see PTL 1).

CITATION LIST

Patent Literature

[PTL 1] JP2002-10573A

SUMMARY OF INVENTION

Technical Problem

In the above generator, there are problems in that it is not possible to use a power generation coil including a magnetic core, and it is not possible to set a distance between the magnets and the magnetic bodies for suppressing cogging closer than a thickness of the coil.

An object of the present invention is to provide an efficient generator using a power generation coil including a magnetic core and being capable of reducing a distance between magnet and magnetic bodies for suppressing cogging regardless of the thickness of the coil.

Solution to Problem

A generator for solving the problems relating to the present invention includes a base, a pair of first magnetic bodies fixed to the base, a rotation shaft rotationally fixed to the pair of first magnetic bodies, an even number of power generation coils having power generation coil cores sandwiched at the same intervals on the same circumference around the rotation shaft by the pair of first magnetic bodies to be in contact with and fixed by the pair of first magnetic bodies, on a side of each of the pair of first magnetic bodies opposite to the even number of power generation coils, first non-magnetic body spacers each fixed to the rotation shaft while maintaining a constant space from each of the pair of first magnetic bodies, second magnetic bodies fixed to each of the first non-magnetic body spacers, and at both ends of each of the second magnetic bodies on one side on a side of the even number of power generation coils, first magnets fixed at a position facing each of the even number of power generation coils being interposed therebetween, on the same circumference, at the same intervals, as the power generation coil around the rotation shaft, while maintaining a constant space from the first magnetic body, in which the first magnetic body is arranged between the power generation coil and the first magnets, the first magnets are arranged at both ends of the second magnetic body, and when the first magnets facing each other are aligned on a single straight line with the power generation coil due to a rotational movement, the first magnets including the first magnets facing each other are arranged so that a direction of magnetic flux density is unidirectional through the second magnetic bodies.

The invention-based generator based on another embodiment, in accordance with the generator according to claim 1, in which a second non-magnetic body spacer fixed to the rotation shaft between the first magnetic body and the first magnets, second magnets facing the first magnets, the second magnets being fixed to the second non-magnetic body spacer so as to maintain a constant space from the first magnetic body, and a set of the power generation coils and the pair of first magnetic bodies, each fixed to the base so as to maintain a constant space between the first magnets and the second magnets being adjacent are added to the generator according to claim 1 once or a plurality of number of times, and when the first magnets and the second magnets facing each other are aligned on a single straight line with the even number of power generation coils due to a rotational movement, the first magnets and the second magnets are arranged so that directions of magnetic flux density are unidirectional through the second magnetic bodies in all the first magnets and the second magnets facing each other.

The invention-based generator is characterized in that regardless of the first magnets and the second magnets, a distance between the magnets closest in a lengthwise direction of the rotation shaft is configured to be shorter than a distance between the magnets closest in a diametrical direction of the rotation shaft.

The invention-based generator is characterized in that a part or all of the first magnets and the second magnets are electromagnets.

Advantageous Effects of Invention

In the present invention, when the magnetic bodies are arranged between the power generation coil and the magnet to suppress cogging, it is possible to facilitate the use of the power generation coil with a magnetic core, when an end of the magnet on the side opposite to the power generation coil is connected with a magnetic body, it is possible to reduce leakage of magnetic flux density, and when the direction of the magnetic flux density is set unidirectional, it is possible to increase the power generation efficiency.

DESCRIPTION OF EMBODIMENTS

To carry out the present invention, description will be provided with reference to the drawings.

Figure 25:
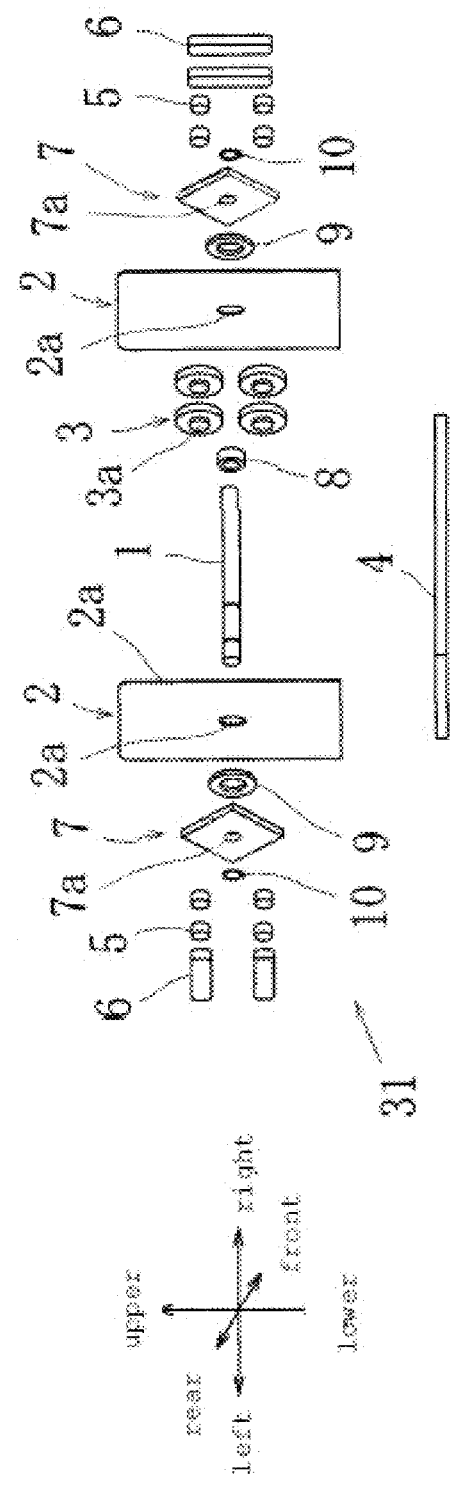
FIG. 25 is a perspective view illustrating an arrangement relationship according to the first embodiment.

A direction will be defined and described based on FIG. 25.

First Embodiment

Figure 1:
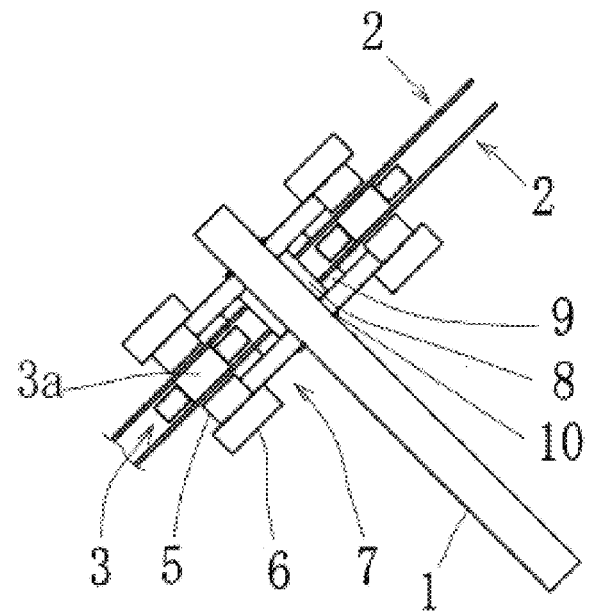
FIG. 1 is a cross-sectional view taken along A-A of FIG. 7 according to a first embodiment.
Figure 2:
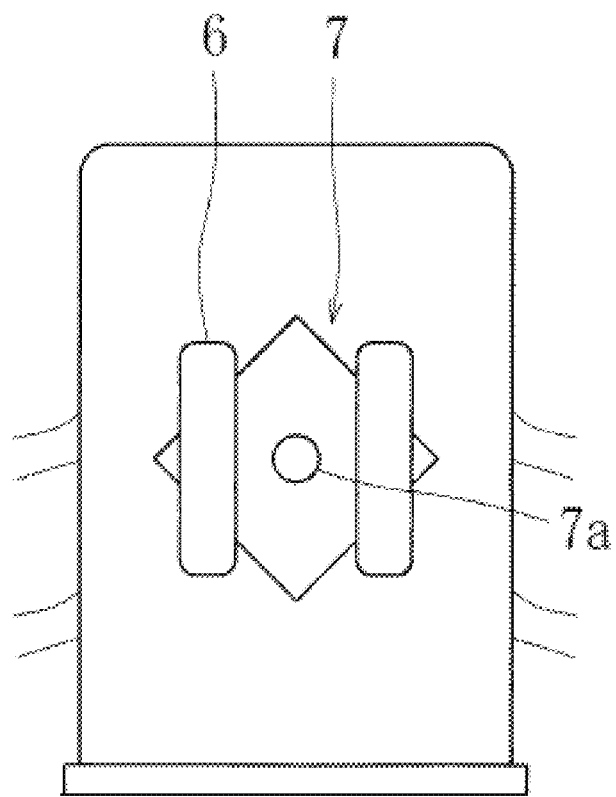
FIG. 2 is a right side view according to the first embodiment.
Figure 3:
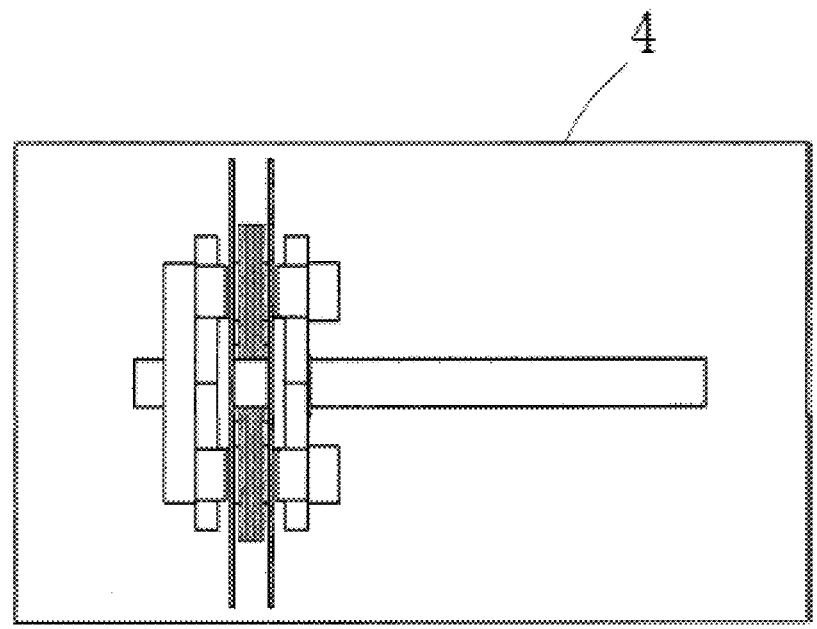
FIG. 3 is a top view according to the first embodiment.
Figure 7:
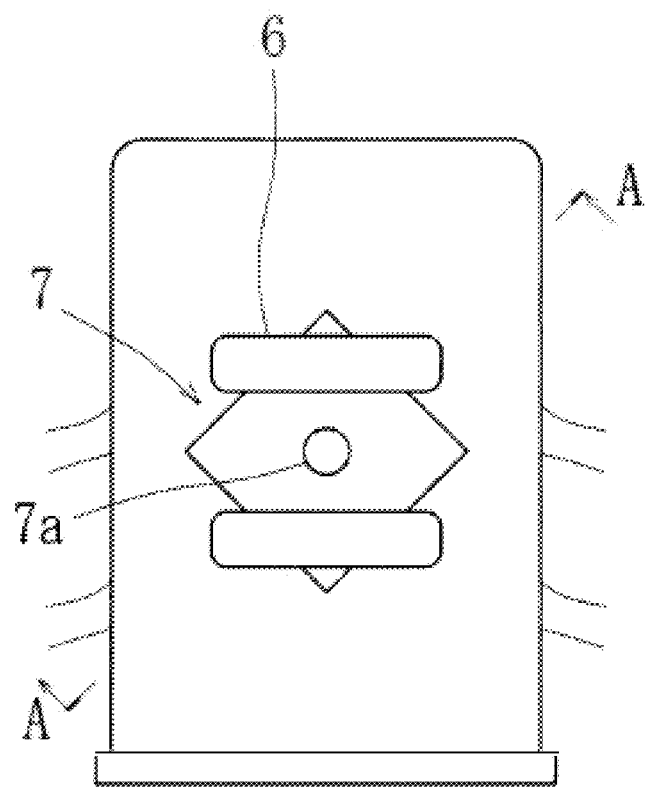
FIG. 7 is a left side view according to the first embodiment.
Figure 10:
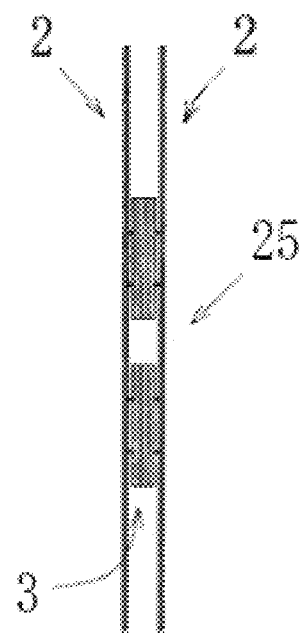
FIG. 10 is a front view of a power generation coil unit.
Figure 11:
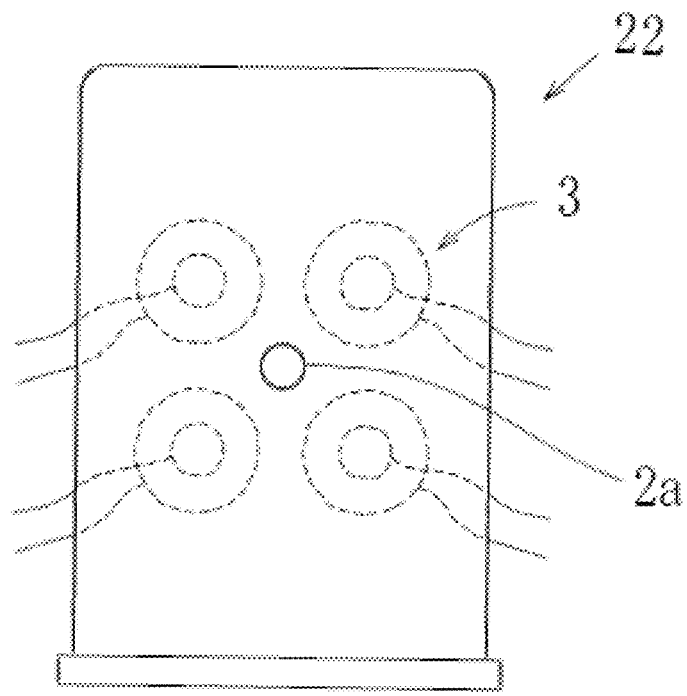
FIG. 11 is a left side view of a fixation unit of the first embodiment.
Figure 12:
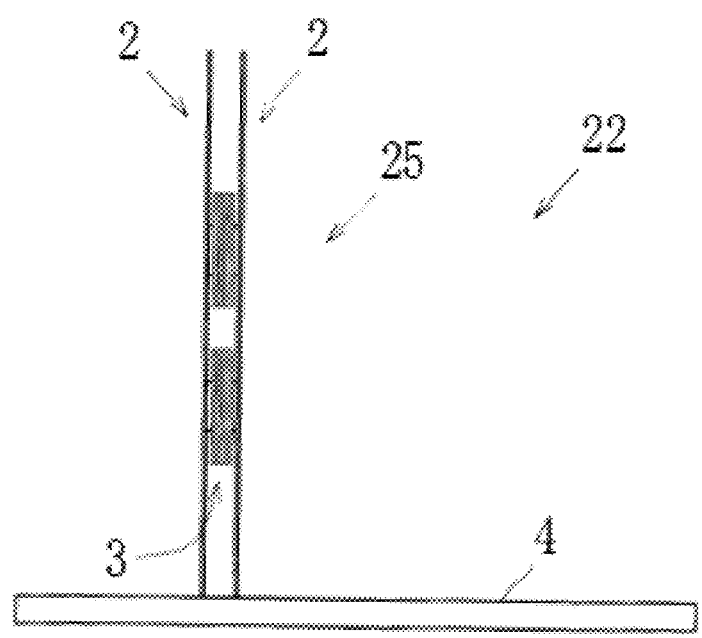
FIG. 12 is a front view of the fixation unit of the first embodiment.

FIG. 7 is a left side view according to a first embodiment of the present invention, FIG. 1 is a cross-sectional view taken along A-A of FIG. 7, FIG. 10 illustrates a power generation coil unit 25, FIG. 11 is a left side view of a fixation unit 22 of the first embodiment of the present invention, and FIG. 12 is a front view of the fixation unit 22 of the first embodiment of the present invention.

As illustrated in FIGS. 1, 10, 11, and 12, at the same intervals on the same circumference around a hole 2a through which a rotation shaft passes, both ends of a magnetic core 3a are fixed in contact with a first magnetic body 2.

A power generation coil unit 25 including a power generation coil 3 and the first magnetic body 2 is fixed to a base 4.

In fixing the magnetic core 3a to the first magnetic body 2 with a screw or the like, a material exhibiting the magnetic property equivalent to that of the magnetic core 3a is preferably used.

Figure 4:
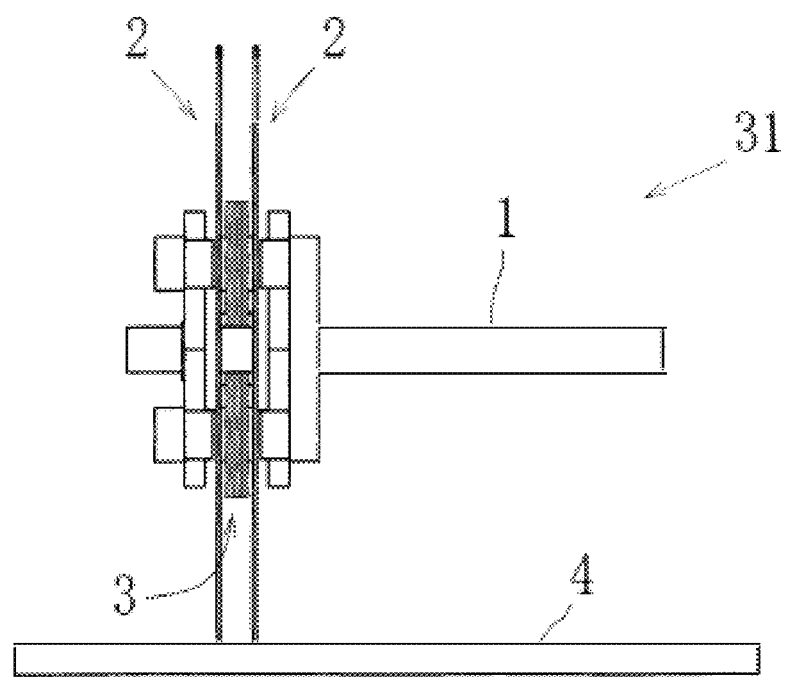
FIG. 4 is a front view according to the first embodiment.
Figure 8:
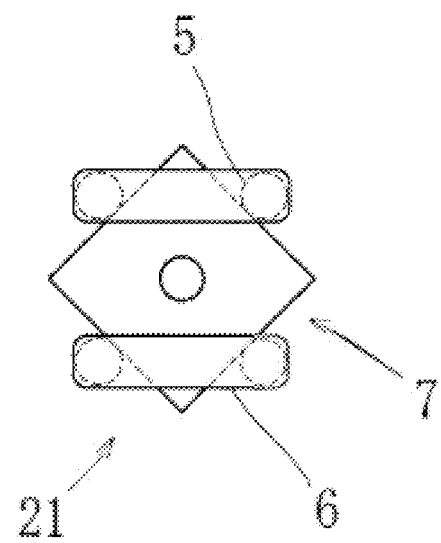
FIG. 8 is a left side view of a rotation unit of the first embodiment.
Figure 9:
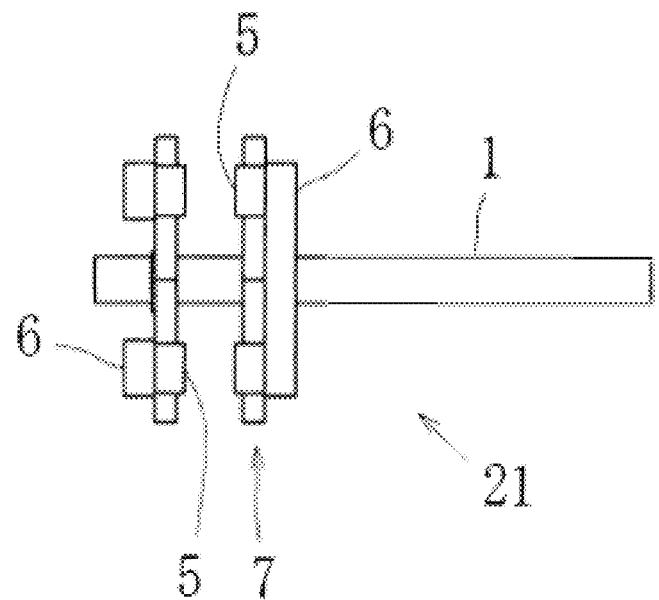
FIG. 9 is a front view of the rotation unit of the first embodiment.

FIG. 4 is a front view according to the first embodiment of the present invention, FIG. 8 is a left side view of a rotation unit 21 of the first embodiment of the present invention, and FIG. 9 is a front view of the rotation unit 21 of the first embodiment of the present invention.

As illustrated in FIGS. 4, 8, 9, and 11, the first magnet 5 is fixed to the rotation shaft 1 via a first non-magnetic body spacer 7 and a second magnetic body 6 so as to maintain a constant space from the first magnetic body 2, at the same intervals on the same circumference as the power generation coil 3 around the rotation shaft 1, at a position facing the power generation coil 3 being interposed therebetween.

In fixing the first magnet 5 to the second magnetic body 6 with a screw or the like, a material exhibiting the magnetic property equivalent to that of the second magnetic body 6 is preferably used.

Figure 5:
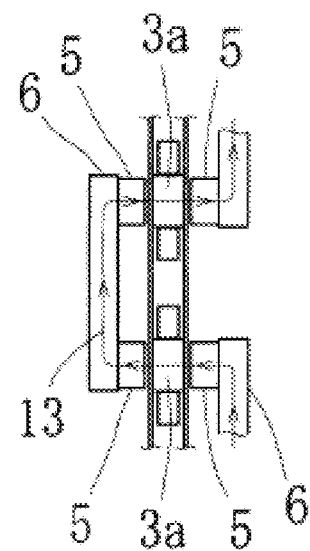
FIG. 5 is a first conceptual diagram illustrating a direction of magnetic flux density in the first embodiment.
Figure 6:
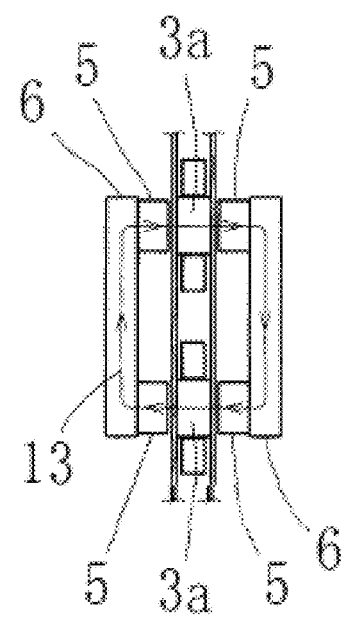
FIG. 6 is a second conceptual diagram illustrating the direction of magnetic flux density in the first embodiment.

FIGS. 5 and 6 are a conceptual diagram illustrating the direction of magnetic flux density according to the first embodiment of the present invention.

When the first magnet 5 and the power generation coil 3 are aligned on a single straight line due to a rotational movement of the rotation unit 21 of the first embodiment, the first magnet 5 is arranged so that the direction of the magnetic flux density are unidirectional, as illustrated in FIGS. 5 and 6.

As long as the magnetic flux density is unidirectional, the direction of an arrow 13 may be reversed.

FIG. 25 is a perspective view illustrating an arrangement relationship according to the first embodiment of the present invention.

As illustrated in FIG. 1, a first bearing 8, a second bearing 9, and a retaining ring 10 are used to rotationally fix the rotation unit 21 of the first embodiment to a fixation unit 22 of the first embodiment.

Up to this point, the rotation unit 21 of the first embodiment and the fixation unit 22 of the first embodiment are described separately, but when the rotation unit 21 of the first embodiment is already assembled, it is not possible to assemble the rotation unit 21 to the fixation unit 22 of the first embodiment.

The assembly proceeds with reference to FIG. 25.

In the first embodiment of the present invention, the shape, quantity, and the like of each component may be changed within the technical scope of the present invention.

Second Embodiment

Figure 19:
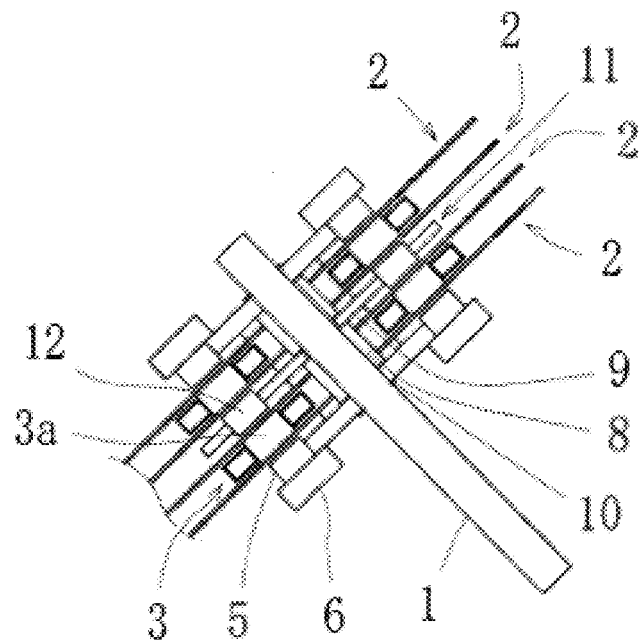
FIG. 19 is a cross-sectional view taken along B-B of FIG. 20 according to the second embodiment.
Figure 20:
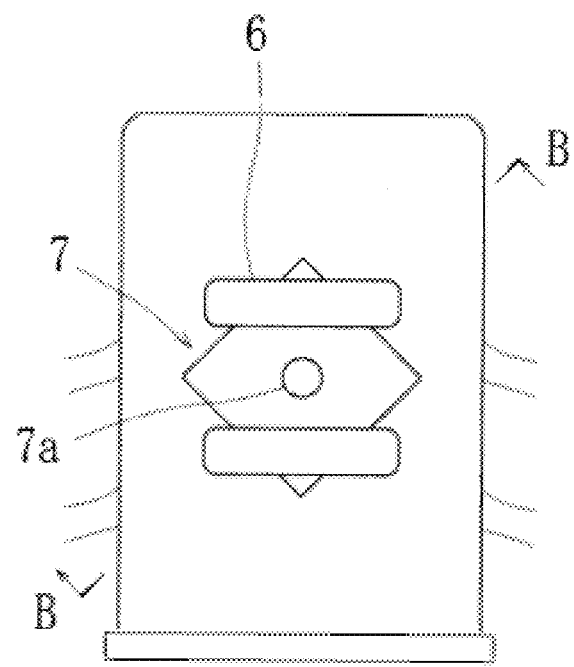
FIG. 20 is a left side view according to the second embodiment.
Figure 22:
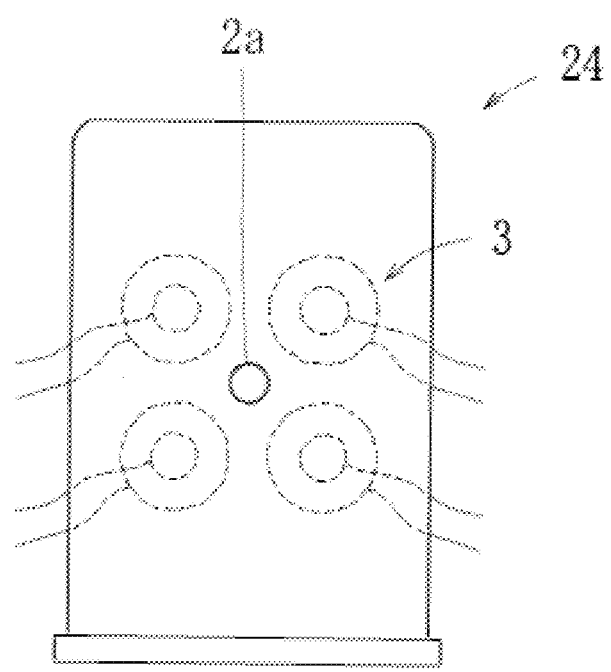
FIG. 22 is a left side view of a fixation unit of the second embodiment.
Figure 23:
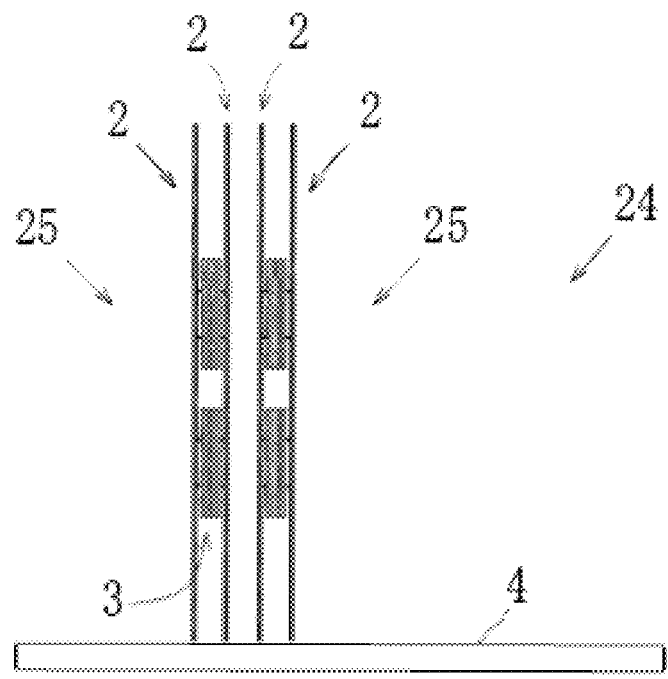
FIG. 23 is a front view of the fixation unit of the second embodiment.

FIG. 20 is a left side view according to a second embodiment of the present invention, FIG. 19 is a cross-sectional view taken along B-B of FIG. 20, FIG. 22 is a left side view of a fixation unit 24 of the second embodiment of the present invention, and FIG. 23 is a front view of the fixation unit 24 of the second embodiment of the present invention.

As illustrated in FIGS. 19, 22, and 23, two sets of power generation coil unit 25, which are exactly the same as those in the first embodiment, are fixed to the base 4.

Figure 13:
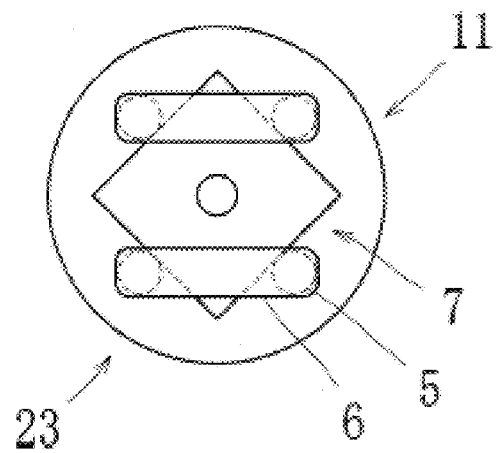
FIG. 13 is a left side view of a rotation unit of a second embodiment.
Figure 14:
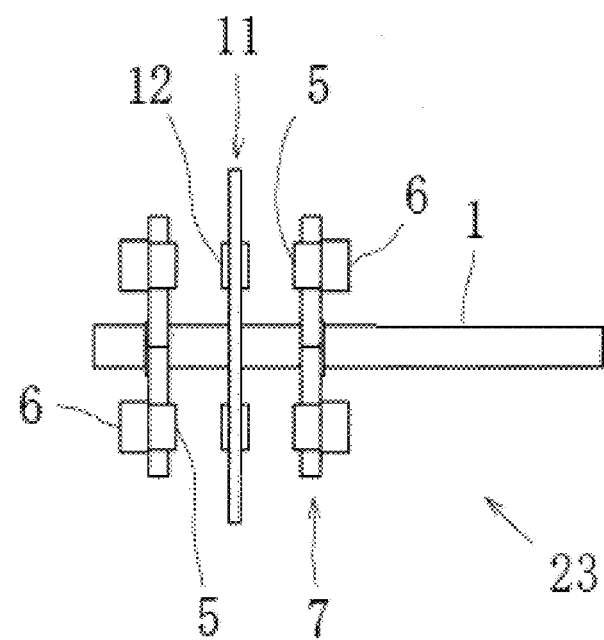
FIG. 14 is a front view of the rotation unit of the second embodiment.
Figure 15:
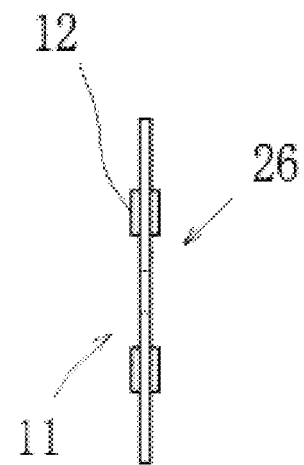
FIG. 15 is a front view of a second magnet unit.
Figure 16:
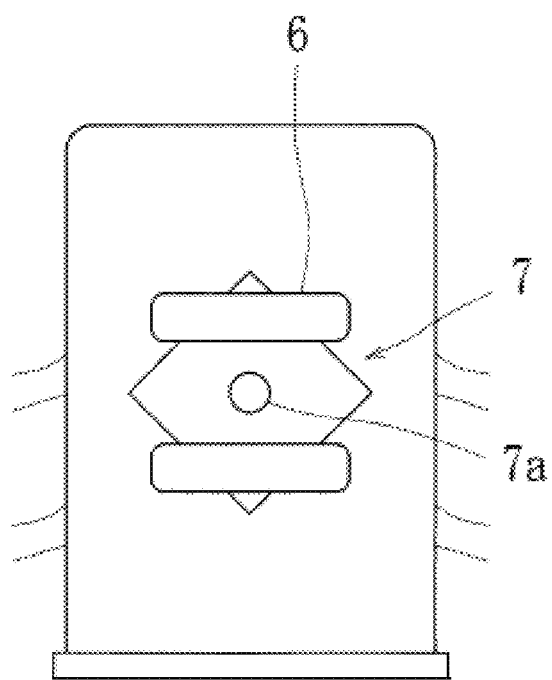
FIG. 16 is a right side view according to the second embodiment.
Figure 18:
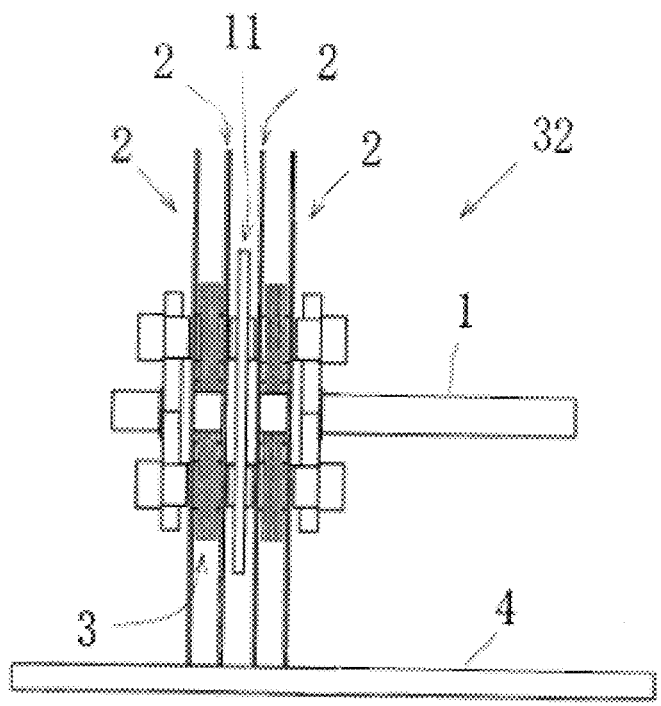
FIG. 18 is a front view according to the second embodiment.

FIG. 18 is a front view according to the second embodiment of the present invention, FIG. 13 is a left side view of a rotation unit 23 of the second embodiment of the present invention, FIG. 14 is a front view of the rotation unit 23 of the second embodiment of the present invention, and FIG. 15 is a front view of a second magnet unit 26.

As illustrated in FIGS. 18, 13, 14, and 15, the first non-magnetic body spacer 7, the second magnetic body 6, and the first magnet 5 are fixed to the rotation shaft 1 in the same manner as in the first embodiment.

The second magnet 12 is fixed to the second non-magnetic body spacer 11 so as to face the first magnet 5, on the same circumference, at the same intervals, as the power generation coil 3 around the rotation shaft 1.

The second magnet unit 26 including the second non-magnetic body spacer 11 and the second magnet unit 12 is fixed to the rotation shaft 1 between two first non-magnetic body spacers 7, as illustrated in FIG. 14.

Figure 17:
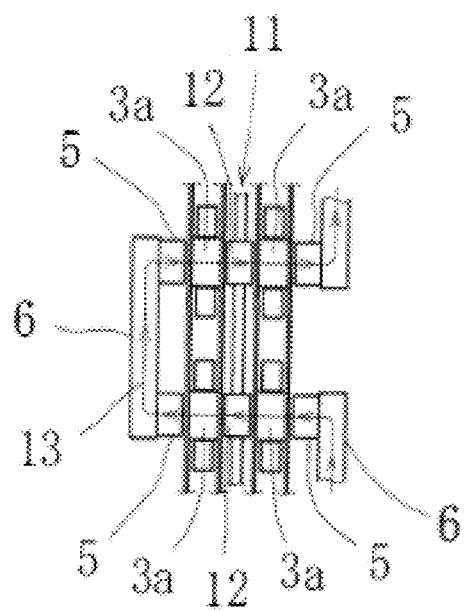
FIG. 17 is a first conceptual diagram illustrating a direction of magnetic flux density in the second embodiment.
Figure 21:
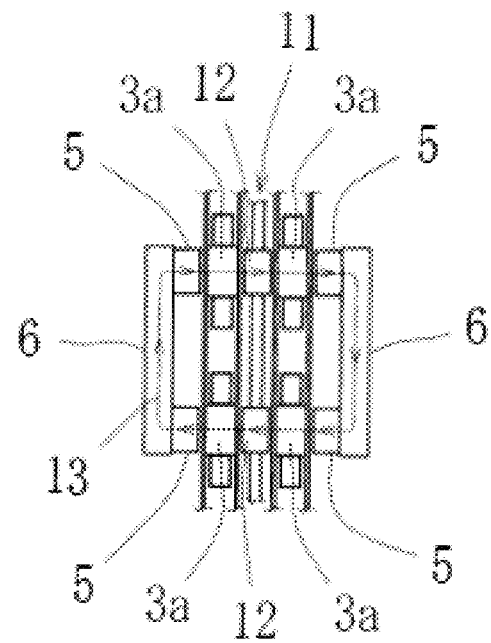
FIG. 21 is a second conceptual diagram illustrating the direction of magnetic flux density in the second embodiment.

FIGS. 17 and 21 are a conceptual diagram illustrating the direction of magnetic flux density according to the second embodiment of the present invention.

When the first magnet 5, the second magnet 12, and the power generation coil 3 are aligned on a single straight line due to a rotational movement of the rotation unit 23 of the second embodiment, the first magnet 5 and the second magnet 12 are arranged so that the direction of the magnetic flux density is unidirectional, as illustrated in FIGS. 17 and 21.

As long as the magnetic flux density is unidirectional, the direction of the arrow 13 may be reversed.

Figure 26:
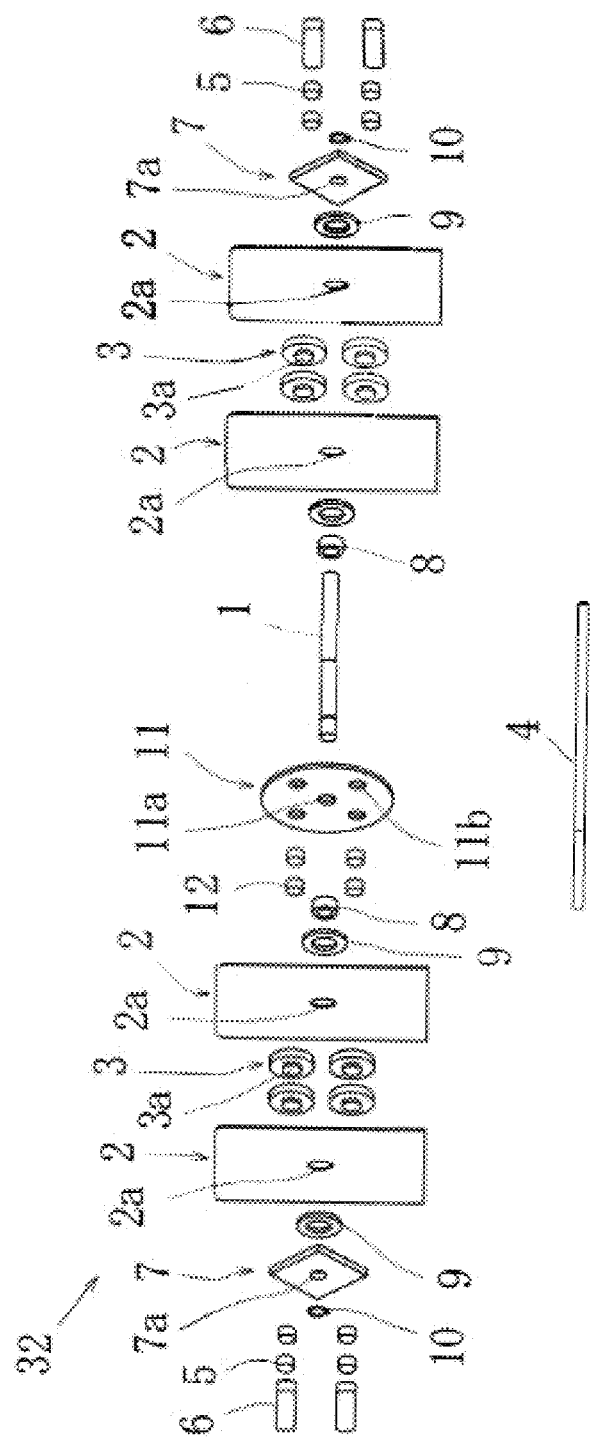
FIG. 26 is a perspective view illustrating an arrangement relationship according to the second embodiment.

FIG. 26 is a perspective view illustrating an arrangement relationship according to the second embodiment of the present invention.

As illustrated in FIG. 19, the first bearing 8, the second bearing 9, and the retaining ring 10 are used to rotationally fix the rotation unit 23 of the second embodiment to the fixation unit 24 of the second embodiment.

Up to this point, the rotation unit 23 of the second embodiment and the fixation unit 24 of the second embodiment are described separately, but when the rotation unit 23 of the second embodiment is already assembled, it is not possible to assemble the rotation unit 23 to the fixation unit 24 of the second embodiment.

Figure 24:
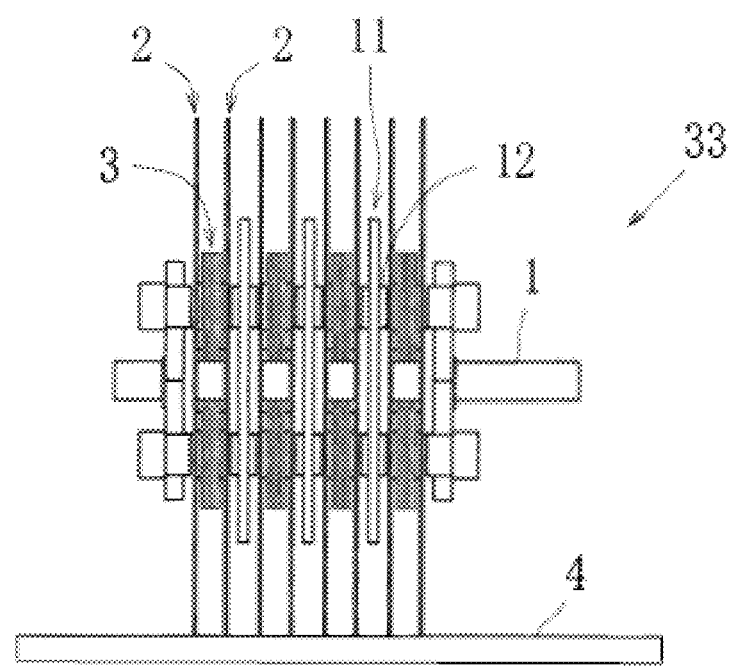
FIG. 24 is a front side view of a third embodiment.

The assembly proceeds with reference to FIG. 24.

In the second embodiment of the present invention, the shape and the quantity of each component may be changed within the technical scope of the present invention.

Third Embodiment

FIG. 24 illustrates a third embodiment in which the power generation coil unit 25 and the second magnet unit 26 are added three times to the first embodiment.

In order to cause a large amount of magnetic flux density to flow through a magnetic core 3a, regardless of the first magnet 5 and the second magnet 12, a distance between the magnets closest in a lengthwise direction of the rotation shaft is more preferably configured to be shorter than a distance between the magnets closest in a diametrical direction of the rotation shaft 1.

Although it is preferable to use a ferromagnetic material for the first magnetic body 2 in order to absorb a large amount of magnetic force, in order to facilitate a flow of magnetic flux density through the power generation coil 3, it is preferable that a magnetic material stronger than the first magnetic body 2 is employed for a material of the magnetic core 3a.

In general, a coil provided with a magnetic core generates more power than a coreless coil, but a magnetic attraction force acts between the magnetic core and the magnet, causing large cogging.

In the present invention, in order to suppress such cogging, it is possible to suppress the cogging by placing a magnetic body between the coil and the magnet, when an end of the magnet opposite to the power generation coil is connected with a magnetic body, it is possible to reduce leakage of magnetic flux density, and when the direction of the magnetic flux density is set unidirectional, it is possible to enhance the power generation efficiency.

REFERENCE SIGNS LIST

1 Rotation shaft
2 First magnetic body
2a Hole through which rotation shaft passes
3 Power generation coil
3a Magnetic body core
4 Base
5 First magnet
6 Second magnetic body
7 First non-magnetic body spacer
7a Hole through which rotation shaft passes
8 First bearing
9 Second bearing
10 Retaining ring
11 Second non-magnetic body spacer
11a Hole through which rotation shaft passes
11b Hole through which second magnet passes
12 Second magnet
13 Arrow indicating direction of magnetic flux density
21 Rotation unit of first embodiment
22 Fixation unit of first embodiment
23 Rotation unit of second embodiment
24 Fixation unit of second embodiment
25 Power generation coil unit
26 Second magnet unit
31 First embodiment
32 Second embodiment
33 Third embodiment

The invention claimed is:

1. A generator, comprising:
a base;
a pair of first magnetic bodies fixed to the base;
a rotation shaft rotationally fixed to the pair of first magnetic bodies;
an even number of power generation coils having power generation coil cores sandwiched at equal intervals on the same circumference around the rotation shaft by the pair of first magnetic bodies to be in contact with and fixed by the pair of first magnetic bodies;
on a side of each of the pair of first magnetic bodies opposite to the even number of power generation coils:
  first non-magnetic body spacers each fixed to the rotation shaft while maintaining a constant space from each of the pair of first magnetic bodies; and
  second magnetic bodies fixed to each of the first non-magnetic body spacers; and
at both ends of each of the second magnetic bodies on one side on a side of the even number of power generation coils:
  first magnets fixed at a position facing each of the even number of power generation coils being interposed therebetween, on the same circumference, at the same intervals, as the power generation coil around the rotation shaft, while maintaining a constant space from the first magnetic body,
wherein:
  the first magnetic body is arranged between the power generation coil and the first magnets,
  the first magnets are arranged at both ends of the second magnetic body, and
  when the first magnets facing each other are aligned on a single straight line with the power generation coil due to a rotational movement, the first magnets including the first magnets facing each other are arranged so that a direction of magnetic flux density is unidirectional through the second magnetic bodies.

2. The generator according to claim 1, wherein:
the generator further includes the following, once or a plurality of times:
  a second non-magnetic body spacer fixed to the rotation shaft between the first magnetic body and the first magnets, second magnets facing the first magnets, the second magnets being fixed to the second non-magnetic body spacer so as to maintain a constant space from the first magnetic body, and a set of the power generation coils and the pair of first magnetic bodies, each fixed to the base so as to maintain a constant space between the first magnets and the second magnets being adjacent, and when the first magnets and the second magnets facing each other are aligned on a single straight line with the even number of power generation coils due to a rotational movement, the first magnets and the second magnets are arranged so that directions of magnetic flux density are unidirectional through the second magnetic bodies in all the first magnets and the second magnets facing each other.

3. The generator according to claim 2, wherein, regardless of the first magnets and the second magnets, a distance between the magnets closest in a lengthwise direction of the rotation shaft is configured to be shorter than a distance between the magnets closest in a diametrical direction of the rotation shaft.

4. The generator according to claim 3, wherein a part or all of the first magnets and the second magnets are electromagnets.

5. The generator according to claim 1, wherein, regardless of the first magnets and the second magnets, a distance between the magnets closest in a lengthwise direction of the rotation shaft is configured to be shorter than a distance between the magnets closest in a diametrical direction of the rotation shaft.

6. The generator according to claim 5, wherein a part or all of the first magnets and the second magnets are electromagnets.

7. The generator according to claim 1, wherein a part or all of the first magnets and the second magnets are electromagnets.

8. The generator according to claim 2, wherein a part or all of the first magnets and the second magnets are electromagnets.

* * * * *